United States Patent
Koga et al.

(10) Patent No.: US 10,056,612 B2
(45) Date of Patent: Aug. 21, 2018

(54) LITHIUM MANGANATE PARTICLES FOR NON-AQUEOUS ELECTROLYTE SECONDARY BATTERY, PROCESS FOR PRODUCING THE SAME, AND NONAQUEOUS ELECTROLYTE SECONDARY BATTERY

(71) Applicant: TODA KOGYO CORPORATION, Hiroshima-shi, Hiroshima-ken (JP)

(72) Inventors: Kazumichi Koga, Sanyo Onoda (JP); Masayuki Uegami, Sanyo Onoda (JP); Hiroaki Masukuni, Sanyo Onoda (JP); Kazutoshi Matsumoto, Sanyo Onoda (JP); Kazutoshi Ishizaki, Kitakyushu (JP); Hideaki Sadamura, Kitakyushu (JP)

(73) Assignee: TODA KOGYO CORPORATION, Hiroshima (JP)

( * ) Notice: Subject to any disclaimer, the term of this patent is extended or adjusted under 35 U.S.C. 154(b) by 0 days.

(21) Appl. No.: 15/147,023

(22) Filed: May 5, 2016

(65) Prior Publication Data

US 2016/0248089 A1    Aug. 25, 2016

Related U.S. Application Data

(62) Division of application No. 13/121,229, filed as application No. PCT/JP2009/004980 on Sep. 29, 2009, now abandoned.

(30) Foreign Application Priority Data

Oct. 1, 2008  (JP) .................................. 2008-256508

(51) Int. Cl.
*H01B 1/08*  (2006.01)
*H01M 4/505*  (2010.01)
(Continued)

(52) U.S. Cl.
CPC ............. *H01M 4/505* (2013.01); *C01G 45/02* (2013.01); *C01G 45/1242* (2013.01); *H01B 1/08* (2013.01);
(Continued)

(58) Field of Classification Search
CPC . C01G 45/02; C01G 45/1242; C01P 2002/52; C01P 2002/77; C01P 2004/03;
(Continued)

(56) References Cited

U.S. PATENT DOCUMENTS 6,890,456 B2 *  5/2005  Noda ..................... H01M 4/131
                                                         252/518.1
8,323,612 B2 * 12/2012  Koga ..................... C01G 45/02
                                                         423/594.15

(Continued)

FOREIGN PATENT DOCUMENTS

DE     199 35 090     2/2001
JP     10-182159      7/1998

(Continued)

OTHER PUBLICATIONS

English translation of Notice of Reason for Rejection in JP 2009-228223 dated Nov. 20, 2013.

(Continued)

*Primary Examiner* — Mark Kopec
*Assistant Examiner* — Jaison P Thomas
(74) *Attorney, Agent, or Firm* — Nixon & Vanderhye P.C.

(57) ABSTRACT

This invention provides lithium manganate which has a high output and is excellent in high-temperature stability. This invention relates to lithium manganate particles which are produced by mixing a lithium compound, a manganese compound, a Y compound and an A compound and then calcining the resulting mixture, and have a composition represented by the following chemical formula 1 and an (Continued)

average secondary particle diameter ($D_{50}$) of 1 to 15 μm, in which Y is at least one element selected from the group consisting of Al and Mg; A is a sintering aid element having a melting point of not higher than 850° C.; x and y satisfy $0.03 \leq x \leq 0.15$ and $0 \leq y \leq 0.20$, respectively; z is in the range of 0 to 2.5 mol % based on Mn, wherein the lithium manganate particles have a sulfur content of not more than 100 ppm.

$$Li_{1+x}Mn_{2-x-y}Y_yO_4zA \qquad \text{(Chemical Formula 1)}$$

3 Claims, 3 Drawing Sheets

(51) Int. Cl.
*H01M 4/04* (2006.01)
*H01M 4/485* (2010.01)
*C01G 45/02* (2006.01)
*C01G 45/12* (2006.01)
*H01M 10/0525* (2010.01)
*H01M 4/46* (2006.01)

(52) U.S. Cl.
CPC ......... *H01M 4/0471* (2013.01); *H01M 4/485* (2013.01); *H01M 10/0525* (2013.01); *C01P 2002/52* (2013.01); *C01P 2002/77* (2013.01); *C01P 2004/03* (2013.01); *C01P 2004/61* (2013.01); *C01P 2006/12* (2013.01); *C01P 2006/80* (2013.01); *H01M 4/46* (2013.01)

(58) Field of Classification Search
CPC .............. C01P 2004/61; C01P 2006/12; C01P 2006/80; H01M 10/0525; H01M 4/0471; H01M 4/46; H01M 4/485; H01M 4/505; H01B 1/08
See application file for complete search history.

(56) References Cited

U.S. PATENT DOCUMENTS

| | | | | |
|---|---|---|---|---|
| 8,440,113 B2* | 5/2013 | Uegami | ............. | C01G 45/1242 252/519.1 |
| 8,821,766 B2* | 9/2014 | Uegami | ............. | C01G 45/1242 252/519.1 |
| 8,852,811 B2* | 10/2014 | Koga | ..................... | C01G 45/02 252/182.1 |
| 9,496,551 B2* | 11/2016 | Koga | ................. | C01G 45/1242 |
| 2002/0009645 A1* | 1/2002 | Shima | ................ | C01G 45/1242 429/224 |
| 2003/0091900 A1* | 5/2003 | Numata | ............. | C01G 45/1242 429/224 |
| 2006/0035151 A1* | 2/2006 | Kumeuchi | ............ | H01M 4/133 429/231.1 |

FOREIGN PATENT DOCUMENTS

| | | | |
|---|---|---|---|
| JP | 11-154512 | 6/1999 | |
| JP | 2000-306577 | 11/2000 | |
| JP | 2001-048547 | 2/2001 | |
| JP | 2001-216968 | 8/2001 | |
| JP | 2001-283847 | 10/2001 | |
| JP | 2002-198047 | 7/2002 | |
| JP | 2003-505326 | 2/2003 | |
| JP | 2004-292264 | 10/2004 | |
| JP | 2006-269106 | 10/2006 | |
| JP | 2008-251390 | 10/2008 | |
| WO | WO 2008/126364 | * 10/2008 | ............. H01M 4/52 |
| WO | WO 2009/063630 | * 5/2009 | ............. H01M 4/52 |
| WO | WO 2009/084214 | * 7/2009 | ............. H01M 4/52 |
| WO | WO 2010/032449 | * 3/2010 | ............. H01M 4/52 |

OTHER PUBLICATIONS

International Preliminary Report on Patentability issued in PCT/JP2009/004980 dated May 10, 2011.
International Search Report for PCT/JP2009/004980, dated Dec. 22, 2010.
Supplementary European Search Report in EP 09 81 7466 dated May 27, 2013.

* cited by examiner

LITHIUM MANGANATE PARTICLES FOR NON-AQUEOUS ELECTROLYTE SECONDARY BATTERY, PROCESS FOR PRODUCING THE SAME, AND NONAQUEOUS ELECTROLYTE SECONDARY BATTERY

This application is a divisional of U.S. application Ser. No. 13/121,299 filed May 10, 2011, which is the U.S. national phase of International Application No. PCT/JP2009/004980, filed Sep. 29, 2009, which claims priority to Japanese Application No. 2008-256508, filed Oct. 1, 2008, the entire contents of each of which are hereby incorporated by reference.

TECHNICAL FIELD

The present invention relates to lithium manganate particles capable of exhibiting a high output and an excellent high-temperature stability.

BACKGROUND ART

With the recent rapid development of portable and cordless electronic devices such as audio-visual (AV) devices and personal computers, there is an increasing demand for secondary batteries having a small size, a light weight and a high energy density as a power source for driving these electronic devices. Under these circumstances, lithium ion secondary batteries having advantages such as a high charge/discharge voltage and a large charge/discharge capacity have been noticed.

Hitherto, as positive electrode active materials useful for high energy-type lithium ion secondary batteries exhibiting a 4 V-grade voltage, there are generally known $LiMn_2O_4$ having a spinel structure and $LiMnO_2$, $LiCoO_2$, $LiCo_{1-x}Ni_xO_2$ and $LiNiO_2$ having a rock-salt type structure, or the like. Among these active materials, $LiCoO_2$ is more excellent because of a high voltage and a high capacity thereof, but has the problems such as a high production cost due to a less amount of a cobalt raw material supplied, and a low environmental safety upon disposal of batteries obtained therefrom. In consequence, there have now been made earnest studies on lithium manganate particles with a spinel type structure (basic composition: $LiMn_2O_4$; this is similarly applied to the subsequent descriptions) which are produced by using, as a raw material, manganese having a large supply amount, a low cost and a good environmental compatibility.

As is known in the art, the lithium manganate particles may be obtained by mixing a manganese compound and a lithium compound at a predetermined mixing ratio and then calcining the resulting mixture at a temperature of 700 to 1000° C.

When using the lithium manganate particles as a positive electrode active material for lithium ion secondary batteries, the resulting secondary batteries have a high output voltage and a high energy density. However, the secondary batteries tend to be deteriorated in charge/discharge cycle characteristics. The reason therefor is considered to be that when charge/discharge cycles are repeated, the crystal lattice is expanded and contracted owing to desorption and insertion behavior of lithium ions in the crystal structure to thereby cause change in volume of the crystal, which results in occurrence of breakage of the crystal lattice or dissolution of manganese in an electrolyte solution.

At present, in the lithium ion secondary batteries using the lithium manganate particles, it has been strongly required to suppress deterioration in charge/discharge capacity due to repeated charge/discharge cycles, and improve the charge/discharge cycle characteristics, in particular, under high-temperature and low-temperature conditions.

In order to improve the charge/discharge cycle characteristics of the secondary batteries, it is required that the positive electrode active material used therein which comprises the lithium manganate particles has an excellent packing property and an appropriate particle size, and further is free from elution of manganese therefrom. To meet the requirements, there have been proposed the method of suitably controlling a particle size and a particle size distribution of the lithium manganate particles; the method of obtaining the lithium manganate particles having a high crystallinity by controlling a calcination temperature thereof; the method of adding different kinds of elements to the lithium manganate particles to strengthen a bonding force of the crystals; the method of subjecting the lithium manganate particles to surface treatment or adding additives thereto to suppress elution of manganese therefrom; or the like.

Conventionally, it is known that aluminum is incorporated in the lithium manganate particles (Patent Document 1). In addition, it is known that a sintering aid such as boron oxide, boric acid, lithium borate and ammonium borate is added upon production of lithium manganate to attain effects by addition of the sintering aid (Patent Document 2). Further, it is known that a content of sulfur in lithium manganate is reduced (Patent Document 3).

Patent Document 1: Japanese Patent Application Laid-Open (KOAKI) No. 2001-146425

Patent Document 2: Japanese Patent Application Laid-Open (KOAKI) No. 2001-48547

Patent Document 3: Japanese Patent Application Laid-Open (KOAKI) No. 2002-198047

DISCLOSURE OF THE INVENTION

Problem to be Solved by the Invention

At present, it has been strongly required to provide lithium manganate as a positive electrode active material for a non-aqueous electrolyte secondary battery which is improved in output characteristics and high-temperature characteristics. However, the lithium manganate capable of fully satisfying these requirements has not been obtained until now.

That is, in the above Patent Documents 1 to 3, there are respectively described the lithium manganate in which a part of manganese as a metal element is substituted with an Al element, the lithium manganate to which a small amount of a sintering aid is added, and the lithium manganate whose sulfur content is reduced. However, these lithium manganates have failed to provide batteries capable of exhibiting satisfactory high-temperature characteristics and, therefore, tend to be still insufficient for practical use.

In consequence, an object or technical task of the present invention is to provide lithium manganate which has a high output and is excellent in high-temperature stability (high-temperature storage characteristics).

Means for Solving the Problem

The above object or technical task can be achieved by the following aspects of the present invention.

That is, according to the present invention, there are provided lithium manganate particles having a composition represented by the following chemical formula 1, which lithium manganate particles have a sulfur content of 1 to 100 ppm and an average secondary particle diameter ($D_{50}$) of 1 to 15 μm, and have such properties that when measuring characteristics of a secondary battery produced by using the lithium manganate particles as a positive electrode active material, a high temperature cycle retention rate of the secondary battery is not less than 92%, and a capacity recovery rate of the secondary battery is not less than 95% (Invention 1).

$$Li_{1+x}Mn_{2-x-y}Y_yO_4+zA \qquad \text{(Chemical Formula 1)}$$

in which Y is at least one element selected from the group consisting of Al and Mg; A is a sintering aid element having a melting point of not higher than 850° C.; x and y satisfy $0.03 \leq x \leq 0.15$ and $0 \leq y \leq 0.20$, respectively; z is in the range of 0 to 2.5 mol % based on Mn.

Also, according to the present invention, there are provided the lithium manganate particles as described in the above Invention 1, wherein the lithium manganate particles have a lattice constant of 0.818 to 0.822 nm (Invention 2).

Also, according to the present invention, there are provided the lithium manganate particles as described in the above Invention 1 or 2, wherein when measuring charge/discharge capacities of the secondary battery produced by using the lithium manganate particles as a positive electrode active material, an initial discharge capacity of the secondary battery is not less than 80 mAh/g and not more than 120 mAh/g (Invention 3).

In addition, according to the present invention, there is provided a process for producing the lithium manganate particles as described in any one of the above Inventions 1 to 3, comprising the steps of:

mixing manganese oxide formed of $Mn_3O_4$, a Y element compound and a lithium compound with each other; and calcining the resulting mixture at a temperature of 800° C. to 1050° C. (Invention 4).

Also, according to the present invention, there is provided the process for producing the lithium manganate particles as described in the above Invention 4, wherein the manganese oxide has a sulfur content of 1 to 60 ppm (Invention 5).

Also, according to the present invention, there is provided the process for producing the lithium manganate particles as described in the above Invention 4, wherein the manganese oxide has an average primary particle diameter of not less than 0.5 μm (Invention 6).

Further, according to the present invention, there is provided a non-aqueous electrolyte secondary battery comprising a positive electrode active material a part or whole of which is formed from the lithium manganese particles as described in any one of the above inventions 1 to 3 (Invention 7).

Effect of the Invention

The lithium manganate particles according to the present invention exhibit a high output and are excellent in high-temperature stability, and, therefore, can be suitably used as a positive electrode active material (cathode active material) for a non-aqueous electrolyte secondary battery.

PREFERRED EMBODIMENTS FOR CARRYING OUT THE INVENTION

Figure 1:
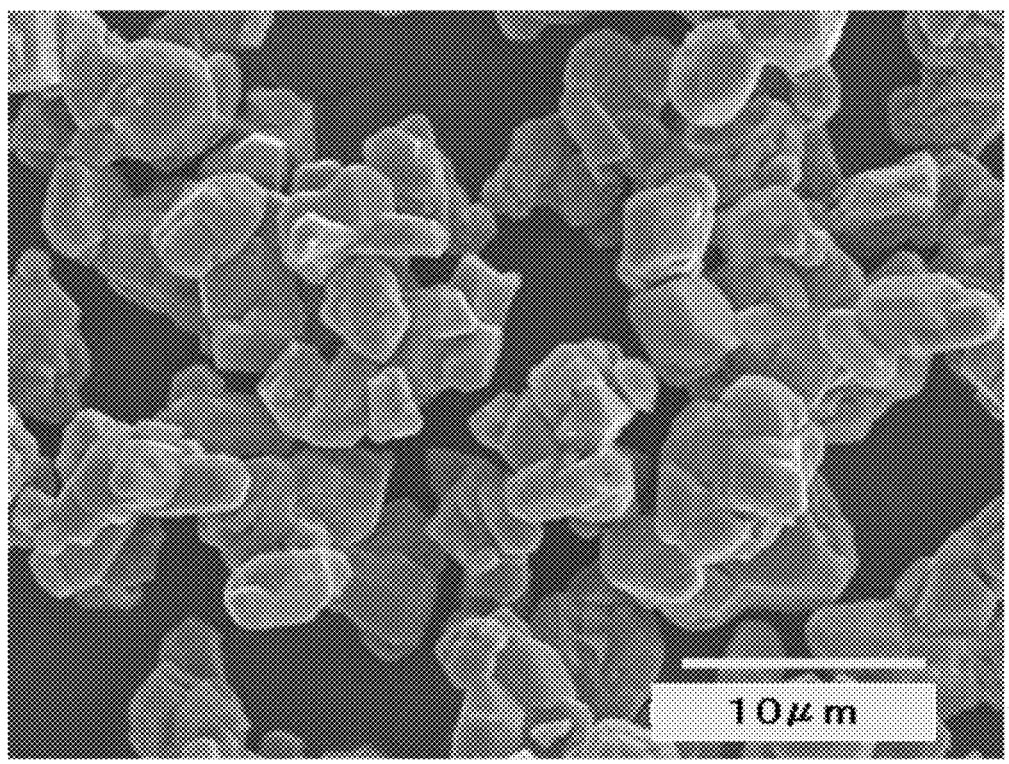
FIG. 1 is an SEM image of lithium manganate obtained in Example 1.
Figure 2:
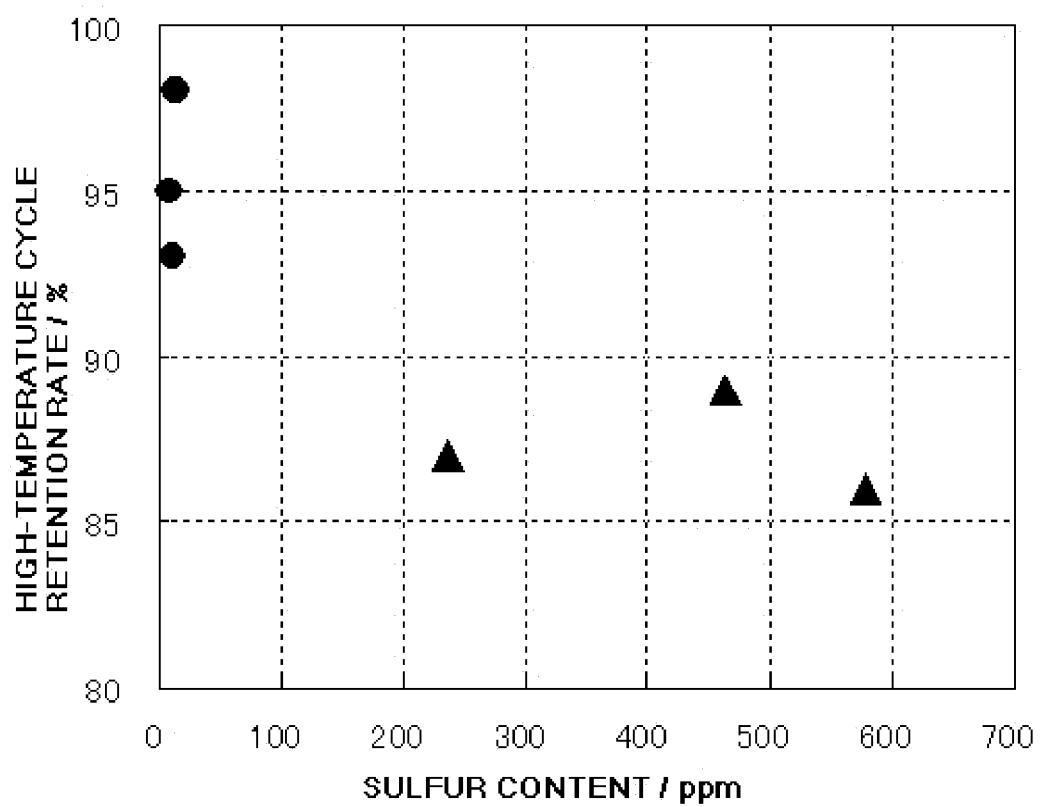
FIG. 2 is a graphic view showing a relationship between a sulfur content and a high-temperature retention rate.
Figure 3:
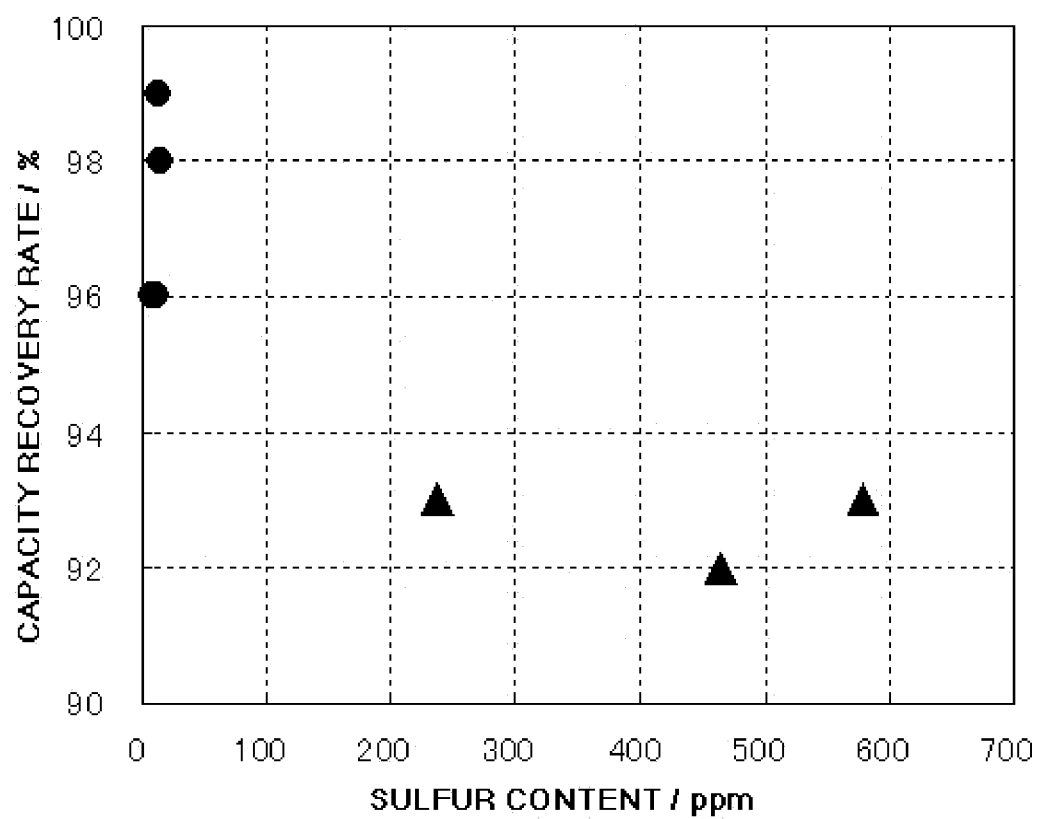
FIG. 3 is a graphic view showing a relationship between a sulfur content and a capacity recovery rate.

The construction of the present invention is described in more detail below.

First, the lithium manganate particles for a non-aqueous electrolyte secondary battery according to the present invention are described.

The lithium manganate particles according to the present invention have a sulfur content of not more than 100 ppm and an average secondary particle diameter ($D_{50}$) of 1 to 15 μm, as well as a high temperature cycle retention rate of not less than 92% and a capacity recovery rate of not less than 95% as measured with respect to a secondary battery produced by using the lithium manganate particles.

The lithium manganate particles according to the present invention have a composition represented by the chemical formula: $Li_{1+x}Mn_{2-x-y}Y_yO_4+zA$. In the chemical formula, Y is at least one element selected from the group consisting of Al and Mg; x is 0.03 to 0.15 and y is 0 to 0.20; and z is in the range of 0 to 2.5 mol % based on Mn.

When the value of x is less than 0.03, the resulting particles have a high capacity, but tends to be considerably deteriorated in high-temperature characteristics. When the value of x is more than 0.15, the resulting particles exhibit improved high-temperature characteristics, but tend to be considerably deteriorated in capacity or tend to cause increase in resistance owing to formation of Li-rich phase therein. The value of x is preferably 0.05 to 0.15.

When the value of y is more than 0.20, the resulting particles tend to suffer from large decrease in capacity and, therefore, tend to be unpractical. The value of y is preferably 0.01 to 0.18 and more preferably 0.05 to 0.15.

When the value of z is more than 2.5 mol % based on Mn, the aggregating effect or anti-sintering effect tends to be too strong, so that the resulting lithium manganate particles tend to be deteriorated in high temperature characteristics. The value of z is preferably in the range of 0 to 0.2 mol % and more preferably 0.1 to 1.8 mol % based Mn.

The lithium manganate particles according to the present invention have a sulfur content of not more than 100 ppm. When the sulfur content of the lithium manganate particles is more than 100 ppm, the particles tend to suffer from accelerated local sintering upon calcination thereof, and localized aggregation of the particles tends to be caused, so that the resulting calcined product tends to have non-uniform distribution of soft portions and hard portions. In addition, when producing a battery using such particles, the obtained battery tends to suffer from short circuit, for example, owing to formation of a sulfur compound with impurities such as Fe. Further, the effect of promoting elution of Mn upon high-temperature storage of the particles tends to be observed, so that the properties of the particles tend to become unstable under high temperature conditions. The sulfur content of the lithium manganate particles is preferably not more than 80 ppm and more preferably 1 to 60 ppm. In the present invention, by dry-mixing the raw manganese material having a less sulfur compound content with the Li compound, Y compound and A compound having a less sulfate content, it is possible to obtain lithium manganate particles whose sulfur content is reduced.

The lithium manganate particles according to the present invention preferably have a lattice constant of 0.818 to 0.822 nm. When the lattice constant of the lithium manganate particles is less than 0.818 nm, the secondary battery obtained by using the particles tends to cause deterioration in capacity. When the lattice constant of the lithium manganate particles is more than 0.822 nm, the secondary battery obtained by using the particles tends to cause deterioration in stability. The lattice constant of the lithium manganate particles is more preferably 0.819 to 0.821 nm.

The lithium manganate particles according to the present invention preferably have an average primary particle diameter of 0.5 to 10 µm. When the average primary particle diameter of the lithium manganate particles is less than 0.5 µm, the secondary battery obtained by using the particles tends to be deteriorated in stability. When the average primary particle diameter of the lithium manganate particles is more than 10 µm, the secondary battery obtained by using the particles tends to be deteriorated in output. The average primary particle diameter of the lithium manganate particles is more preferably 1.0 to 8.0 µm.

The lithium manganate particles according to the present invention have an average secondary particle diameter ($D_{50}$) of not less than 1.0 µm and not more than 15 µm. When the average secondary particle diameter ($D_{50}$) of the lithium manganate particles is less than 1 µm, the secondary battery obtained by using the particles tends to be deteriorated in stability. When the average secondary particle diameter ($D_{50}$) of the lithium manganate particles is more than 15 µm, the secondary battery obtained by using the particles tends to be deteriorated in output. The average secondary particle diameter ($D_{50}$) of the lithium manganate particles is preferably 2.0 to 12.0 µm.

The lithium manganate primary particles according to the present invention are preferably constituted of substantially a single crystal. When the lithium manganate particles are constituted of a polycrystal, a large number of lattice-unconformity planes which act as a resistance component against desorption and insertion of lithium in the particles tend to be present in the crystals, so that it may be sometimes difficult to allow the secondary battery obtained by using the particles to generate a sufficient output.

The BET specific surface area of the lithium manganate particles according to the present invention is preferably not more than 1.0 m²/g and more preferably 0.1 to 0.8 m²/g.

Next, the process for producing the lithium manganate particles according to the present invention is described.

The lithium manganate particles according to the present invention can be produced by mixing manganese oxide formed of $Mn_3O_4$ and a lithium compound, if required, together with a Y element compound and/or a sintering aid having a melting point of not higher than 850° C., and then calcining the resulting mixture at a temperature of 800° C. to 1050° C.

The manganese compound used as a starting material of the lithium manganate particles according to the present invention is preferably $Mn_3O_4$. $Mn_3O_4$ may be produced by a wet reaction with a less amount of impurities unlike electrolytic $MnO_2$, and can provide particles substantially in the form of a single crystal.

More specifically, $Mn_3O_4$ may be produced by the following methods: (1) the method for producing trimanganese tetraoxide particles by reacting an aqueous manganese salt solution with an aqueous alkali solution to prepare a water suspension comprising manganese hydroxide; subjecting the resulting water suspension to oxidation reaction as a primary reaction at a temperature of 60 to 100° C. for obtaining trimanganese tetraoxide core particles; adding an aqueous manganese salt solution to a reaction solution obtained after the primary reaction; and then subjecting the obtained mixture to oxidation reaction as a secondary reaction for conducting a growth reaction of the trimanganese tetraoxide core particles, thereby obtaining trimanganese tetraoxide particles, wherein a concentration of manganese used in the primary reaction is adjusted to not more than 1.5 mol/L, and an amount of manganese added to the secondary reaction is adjusted to not more than an equal mol of the concentration of manganese used in the primary reaction, (2) the above method for producing the trimanganese tetraoxide particles in which after changing an atmosphere of the reaction solution obtained after the primary reaction to a non-oxidative atmosphere, an aqueous manganese salt solution is added to the reaction solution, and then the resulting mixture is aged within 3 hr, (3) the above method for producing the trimanganese tetraoxide particles in which an organic reducing agent is allowed to be present in an amount of not more than 0.5 mol % based on manganese during the primary reaction and/or the secondary reaction, and (4) the above method for producing the trimanganese tetraoxide particles in which a concentration of the excess amount of alkali is adjusted to 1.0 to 5 mol/L to produce trimanganese tetraoxide particles.

The trimanganese tetraoxide ($Mn_3O_4$) used in the present invention preferably has an average secondary particle diameter ($D_{50}$) of 1.0 to 8.0 µm, an average primary particle diameter of not less than 0.5 µm and more preferably 1.0 to 8.0 µm, a BET specific surface area of 0.5 to 15 m²/g, and a sulfur content of 1 to 60 ppm and more preferably 1 to 50 ppm. In addition, the trimanganese tetraoxide ($Mn_3O_4$) is preferably substantially in the form of a single crystal.

As to the Y element (Al/Mg) in the lithium manganate particles according to the present invention, when the Y element compound is formed into finely divided particles, it is possible to enhance a reactivity of the Y element compound with the manganese compound, so that the Y element can be uniformly dispersed within the obtained particles. When the Y element is localized in the lithium manganate particles, the resulting particles tend to be deteriorated in stability. The particle diameter of the Y element compound is preferably controlled such that an average secondary particle diameter ($D_{50}$) thereof is 1.0 to 20 µm.

In the present invention, the lithium manganese particles may be calcined after adding a sintering aid having a melting point of not higher than 800° C. thereto. The melting point of the sintering aid is preferably not higher than 600° C. The sintering aid having a melting point of not higher than 800° C. is preferably a boron compound. Examples of the boron compound include boric acid, lithium tetraborate, boron oxide and ammonium borate. Among these boron compounds, the use of boric acid is especially preferred.

The manganese oxide and the lithium compound are mixed, if required, together with the Y element compound and/or the A element compound, at a predetermined mixing ratio, and then the resulting mixture is subjected to calcination solid state reaction to thereby obtain lithium manganate. However, the calcination temperature must be not lower than 800° C. When the calcination temperature is lower than 800° C., it may be difficult to uniformly disperse the Y element compound within the particles.

For example, in the above-mentioned Patent Document 1 (Japanese Patent Application Laid-Open (KOKAI) No. 2001-146425), it is described that a homogeneously distributed condition of Al has been confirmed by EPMA analysis of an appearance of the respective particles. However, such a result will also be attained even when Al is localized only on the surface of the particles. In fact, when actually measuring an output of a secondary battery obtained by using the particles in which Al was localized, such a secondary battery exhibits a large resistance, and it is difficult to obtain a suitable electric current from the secondary battery. The calcination temperature is preferably 850 to 1050° C.

Next, a positive electrode using the positive electrode active material comprising the lithium manganate particles for a non-aqueous electrolyte secondary battery according to the present invention is described.

When producing the positive electrode by using the positive electrode active material according to the present invention, a conducting agent and a binder are added to and mixed with the positive electrode active material by an ordinary method. Examples of the preferred conducting agent include acetylene black, carbon black and graphite. Examples of the preferred binder include polytetrafluoroethylene and polyvinylidene fluoride.

The secondary battery produced by using the positive electrode active material according to the present invention comprises the above positive electrode, a negative electrode and an electrolyte.

Examples of a negative electrode active material which may be used for obtaining the negative electrode include metallic lithium, lithium/aluminum alloys, lithium/tin alloys, and graphite or black lead.

Also, as a solvent for the electrolyte solution, there may be used combination of ethylene carbonate and diethyl carbonate, as well as an organic solvent comprising at least one compound selected from the group consisting of carbonates such as propylene carbonate and dimethyl carbonate, and ethers such as dimethoxyethane.

Further, as the electrolyte, there may be used a solution prepared by dissolving, in addition to lithium phosphate hexafluoride, at least one lithium salt selected from the group consisting of lithium perchlorate and lithium borate tetrafluoride in the above solvent.

The secondary battery produced by using the lithium manganate particles according to the present invention has an initial discharge capacity of 80 to 120 mAh/g, a rate characteristic of preferably not less than 80% and more preferably not less than 90%, a high-temperature cycle retention rate of not less than 92% and a capacity recovery rate of not less than 95%. Meanwhile, the high-temperature cycle retention rate and the capacity recovery rate may be determined by the measuring methods described in the following Examples.

EXAMPLES

Typical examples of the present invention are described in more detail below.

The average secondary particle diameter ($D_{50}$) of the particles was a volume median particle diameter thereof as measured by a wet laser method using a laser type particle size distribution measuring apparatus "MICROTRACK HRA" manufactured by Nikkiso Co., Ltd.

The average primary particle diameter of the particles was expressed by an average value of diameters of the particles which were observed using a scanning electron microscope "SEM-EDX" equipped with an energy disperse type X-ray analyzer manufactured by Hitachi High-Technologies Corp., and read out from a micrograph thereof.

The condition of presence of respective elements in the particles was observed using a scanning electron microscope "SEM-EDX" equipped with an energy disperse type X-ray analyzer manufactured by Hitachi High-Technologies Corp.

The composition of the particles was determined in the following manner. That is, 0.2 g of a sample was dissolved under heating in 25 mL of a 20% hydrochloric acid solution. The resulting solution was cooled and then charged into a measuring flask together with pure water to prepare a sample solution. The resulting sample solution was subjected to the measurement using ICAP "SPS-400" manufactured by Seiko Denshi Kogyo Co., Ltd., to quantitatively determine amounts of the respective elements therein.

The sulfur content of the particles was the value measured by burning 5 g of a sample in an oxygen flow using a combustion furnace of a carbon/sulfur analyzer "EMIA-520FA" manufactured by Horiba Seisakusho Co., Ltd.

The X-ray diffraction of a sample was measured using "RAD-IIA" manufactured by Rigaku Co., Ltd.

The lattice constant of the particles was calculated from the results of the above powder X-ray diffraction by a Rietveld method.

Whether or not the crystal structure of the particles as produced was a single crystal was confirmed by observing an oriented plane of a section of the particles by EBSD analysis.

The coin cell produced by the following method using the lithium manganate particles was subjected to evaluation for initial charge/discharge characteristics and high-temperature storage characteristics.

First, 92% by weight of the Li—Mn composite oxide as a positive electrode active material, 2.5% by weight of acetylene black and 2.5% by weight of a graphite both serving as a conducting material, and 3% by weight of polyvinylidene fluoride dissolved in N-methyl pyrrolidone as a binder, were mixed with each other, and then the resulting mixture was applied onto an Al metal foil and then dried at 110° C. The thus obtained sheets were each blanked into 16 mmϕ and then compression-bonded together under a pressure of 1 t/cm², thereby producing an electrode having a thickness of 50 µm and using the thus produced electrode as a positive electrode. In addition to the positive electrode, a metallic lithium blanked into 16 mmϕ was used as a negative electrode, and a solution prepared by mixing EC and DEC in which 1 mol/L of $LiPF_6$ was dissolved, with each other at a volume ratio of 3:7, was used as an electrolyte solution, thereby producing a coin cell of a CR2032 type.

The initial charge/discharge characteristics of the coin cell were determined as follows. That is, the coin cell was charged at 25° C. at a current density of 0.1 C until reaching 4.3 V and then subjected to constant voltage charge for 90 min, and further discharged at a current density of 0.1 C until reaching 3.0 V, to thereby measure an initial charge capacity, an initial discharge capacity and an initial charge/discharge efficiency of the coin cell.

In order to determine high temperature characteristics of the coin cell, a capacity recovery rate thereof was measured as follows. That is, the coin cell was subjected to one charge/discharge cycle (discharge capacity: a) and then charged at a current density of 0.1 C until reaching a charge depth of 50%. Thereafter, the coin cell was allowed to stand at 60° C. for one week and then discharged at a current density of 0.1 C until reaching 3.0 V, and further charged and discharged (discharge capacity: b) at a current density of 0.1 C to determine a "capacity recovery rate" thereof (=100×b/a).

In addition, in order to determine a "high-temperature cycle retention rate" of the coin cell, the coin cell was subjected to charging and discharging cycles in a constant temperature oven held at 60° C. in a voltage range of 3.0 to 4.3 V in which at the 1st, 11th, 21st and 31st cycles, the cell was charged and discharged at a current density of 0.1 C (the charging was conducted in a constant current-90 min constant voltage charge mode), whereas at the other cycles, the coin cell was subjected to repeated charging and discharging at a current density of 1 C (the charging was conducted in a constant current-90 min constant voltage charge mode). The "high-temperature cycle retention rate" of the coin cell was determined by a ratio of the 31st cycle discharge capacity d to an initial discharge capacity c thereof (=100× d/c).

Further, the coin cell was subjected to charging and discharging cycles at 25° C. in a voltage range of 3.0 to 4.3 V in which the charging was conducted at a current density of 0.1 C, whereas the discharging was conducted at a current density of 0.1 C, 0.2 C, 0.5 C, 1 C, 2 C and 5 C. At this time, the value of (discharge capacity at 5 C/discharge capacity at 0.1 C)×100 was determined as a "rate characteristic" of the coin cell.

Example 1: <Production of Lithium Manganate Particles>

Under a nitrogen flow, 0.5 mol of manganese sulfate was added to 3.5 mol of sodium hydroxide to prepare a reaction solution having a total volume of 1 L. Manganese hydroxide thus produced was aged at 90° C. for 1 hr. After completion of the aging, air was passed through the reaction solution to oxidize manganese hydroxide at 90° C., and the resulting product was washed with water and then dried, thereby obtaining manganese oxide particles.

The thus obtained manganese oxide particles were $Mn_3O_4$ and had a granular shape, an average primary particle diameter of 4.8 µm, a BET specific surface area of 0.6 m$^2$/g and a sulfur content of 8 ppm.

The above $Mn_3O_4$ particles, lithium carbonate and aluminum hydroxide were mixed with each other for 1 hr such that a ratio of Li:Mn:Al was 1.072:1.828:0.10, thereby obtaining a uniform mixture. The aluminum hydroxide used above had an average secondary particle diameter ($D_{50}$) of 10 µm. Fifty grams of the thus obtained mixture were placed in an alumina crucible, and held therein in atmospheric air at 960° C. for 3 hr, thereby obtaining lithium manganate particles. Thus, the lithium manganate particles were produced.

It was confirmed that the thus obtained lithium manganate particles had a composition of $Li_{1+x}Mn_{2-x-y}Y_yO_4$ in which x is 0.072 and y is 0.10, an average primary particle diameter of 5.0 µm, an average secondary particle diameter ($D_{50}$) of 7.3 µm, a BET specific surface area of 0.45 m$^2$/g, a lattice constant of 0.8198 nm and a sulfur content of 12 ppm.

The coin cell produced by using a positive electrode active material comprising the thus obtained lithium manganate particles had an initial discharge capacity of 105 mAh/g, a capacity recovery rate of 96% as measured after preserving the coin cell at 60° C. for one week, a high-temperature cycle retention rate of 95% and a rate characteristic of 96%.

Example 2

The same procedure as defined in Example 1 was conducted except that the kind of manganese oxide used was changed, the $Mn_3O_4$ particles, lithium carbonate and aluminum hydroxide were mixed simultaneously with boric acid to prepare a composition as shown in Table 1, and further the calcination temperature was changed as shown in Table 1, thereby obtaining lithium manganate particles.

The production conditions used above are shown in Table 1, and various properties of the thus obtained lithium manganate particles are shown in Table 2.

The lithium manganate particles obtained in Example 2 were kneaded with a resin, and the particles in the resulting kneaded material were cut using a cross-section polisher. The condition of distribution of Mn and Al on a section of each of the thus cut particles was determined from the results of EPMA mapping thereof. As a result, it was confirmed that Al was also uniformly distributed over the section of each particle similarly to Mn.

Examples 3 to 5

The same procedure as defined in Example 1 was conducted except that the kind of Y (Al, Mg), the amount of Y added, and calcination conditions, were changed variously, thereby obtaining lithium manganate particles.

The production conditions used above are shown in Table 1, and various properties of the thus obtained lithium manganate particles are shown in Table 2.

Comparative Example 1

Electrolytic manganese oxide ($MnO_2$; average primary particle diameter: 15.1 µm), aluminum hydroxide ($Al(OH)_3$) and lithium carbonate were mixed with each other, and then the resulting mixture was calcined at 960° C., thereby obtaining lithium manganate particles.

The production conditions used above are shown in Table 1, and various properties of the thus obtained lithium manganate particles are shown in Table 2.

Comparative Example 2

Manganese oxide particles formed of $Mn_3O_4$ which had a granular particle shape and an average primary particle diameter of 4.8 µm were used.

A water suspension comprising the above manganese oxide particles was washed with water in an amount of 5 times the amount of the water suspension using a filter press, and then subjected to deaggregation to adjust a concentration of the manganese oxide particles in the water suspension to 10% by weight. A 0.2 mol/L sodium aluminate aqueous solution was continuously fed to the suspension in a reaction vessel such that a molar ratio of Mn:Al in the resulting mixture was 95:5. The contents of the reaction vessel were always kept stirred by a stirrer and, at the same time, a 0.2 mol/L sulfuric acid aqueous solution was automatically supplied thereto so as to control the pH value of the reaction solution in the reaction vessel to 8±0.5, thereby obtaining a suspension comprising the manganese oxide particles whose surface was coated with aluminum hydroxide.

The resulting suspension was washed with water in an amount of 10 times the weight of the manganese oxide particles in the suspension using a filter press, and then dried, thereby obtaining the manganese oxide particles whose surface was coated with aluminum hydroxide and which had a molar ratio of Mn:Al of 95:5 and an average secondary particle diameter of 4.8 μm. The resulting manganese oxide particles had a sulfur content of 237 ppm.

The thus obtained $Mn_3O_4$ particles whose surface was coated with aluminum hydroxide and lithium carbonate were dry-mixed with each other for 1 hr such that a molar ratio of Li:Mn:Al was 1.072:1.828:0.10, thereby obtaining a mixture. Thirty grams of the thus obtained mixture were placed in an alumina crucible, and held therein in atmospheric air at 960° C. for 3 hr, thereby obtaining lithium manganate particles.

The production conditions used above are shown in Table 1, and various properties of the thus obtained lithium manganate particles are shown in Table 2.

Comparative Example 3

The same procedure as defined in Comparative Example 2 was conducted except that the $Mn_3O_4$ particles and lithium carbonate were mixed simultaneously with boric acid to prepare a composition as shown in Table 1, thereby obtaining lithium manganate particles.

The production conditions used above are shown in Table 1, and various properties of the thus obtained lithium manganate particles are shown in Table 2.

Comparative Example 4

The manganese oxide particles whose surface was coated with aluminum hydroxide were obtained in the same manner as in Comparative Example 2 and then mixed with lithium carbonate and magnesium oxide, and the resulting mixture was calcined.

The production conditions used above are shown in Table 1, and various properties of the thus obtained lithium manganate particles are shown in Table 2.

Comparative Example 5

The same procedure as defined in Example 1 was conducted except that the kind of Mn compound and the calcination conditions were changed variously, thereby obtaining lithium manganate particles.

The production conditions used above are shown in Table 1, and various properties of the thus obtained lithium manganate particles are shown in Table 2.

Comparative Example 6

The same procedure as defined in Example 1 was conducted except that a Y element (Al, Mg) element compound having an average secondary particle diameter ($D_{50}$) of 80 μm which was 8 times that of the Y element compound used in Example 1 was used as the raw material, thereby obtaining lithium manganate particles.

The production conditions used above are shown in Table 1, and various properties of the thus obtained lithium manganate particles are shown in Table 2.

TABLE 1

| Examples and Comp. Examples | Precursor | | | | |
|---|---|---|---|---|---|
| | Kind of Mn compound (—) | Average primary particle diameter (μm) | Coating element (—) | y (—) | Sulfur content (ppm) |
| Example 1 | $Mn_3O_4$ | 4.8 | — | — | 8 |
| Example 2 | $Mn_3O_4$ | 4.9 | — | — | 12 |
| Example 3 | $Mn_3O_4$ | 1.2 | — | — | 11 |
| Example 4 | $Mn_3O_4$ | 4.8 | — | — | 9 |
| Example 5 | $Mn_3O_4$ | 4.7 | — | — | 14 |
| Comp. Example 1 | $MnO_2$ | 15.1 | — | — | 1430 |
| Comp. Example 2 | $Mn_3O_4$ | 4.8 | Al | 0.10 | 237 |
| Comp. Example 3 | $Mn_3O_4$ | 4.9 | Al | 0.10 | 464 |
| Comp. Example 4 | $Mn_3O_4$ | 4.7 | Al | 0.10 | 578 |
| Comp. Example 5 | $Mn_3O_4$ | 7.8 | — | — | 8 |
| Comp. Example 6 | $Mn_3O_4$ | 4.8 | — | — | 8 |

| Examples and Comp. Examples | Mixing | | | |
|---|---|---|---|---|
| | Amount of Li x (—) | Kind of Y element dry-added (—) | Amount of Y element added (—) | Particle diameter of Y element compound (μm) |
| Example 1 | 0.072 | $Al(OH)_3$ | 0.1 | 10 |
| Example 2 | 0.079 | $Al(OH)_3$ | 0.1 | 10 |
| Example 3 | 0.138 | — | — | — |
| Example 4 | 0.059 | MgO | 0.05 | 2 |
| Example 5 | 0.039 | $Al(OH)_3$/MgO | 0.1/0.05 | 10/2 |
| Comp. Example 1 | 0.065 | $Al(OH)_3$ | 0.1 | 10 |
| Comp. Example 2 | 0.072 | — | — | — |
| Comp. Example 3 | 0.072 | — | — | — |
| Comp. Example 4 | 0.039 | MgO | 0.05 | 2 |
| Comp. Example 5 | 0.072 | $Al(OH)_3$ | 0.1 | 10 |
| Comp. Example 6 | 0.072 | $Al(OH)_3$ | 0.1 | 80 |

| Examples and Comp. Examples | Mixing | | Calcination conditions | |
|---|---|---|---|---|
| | Kind of A element (—) | Amount of A element added (mol %) | Temperature in air (° C.) | Time (hr) |
| Example 1 | — | — | 960 | 3 |
| Example 2 | B | 1.3 | 910 | 3 |
| Example 3 | — | — | 870 | 3 |
| Example 4 | — | — | 870 | 3 |
| Example 5 | — | — | 870 | 3 |
| Comp. Example 1 | — | — | 960 | 3 |
| Comp. Example 2 | — | — | 960 | 3 |
| Comp. Example 3 | B | 1.5 | 910 | 3 |
| Comp. Example 4 | — | — | 960 | 3 |
| Comp. Example 5 | — | — | 760 | 3 |
| Comp. Example 6 | — | — | 960 | 3 |

TABLE 2

Properties of lithium manganate particles

| Examples and Comp. Examples | Composition | Average primary particle diameter (μm) |
|---|---|---|
| Example 1 | $Li_{1.072}Mn_{1.828}Al_{0.1}O_4$ | 5 |
| Example 2 | $Li_{1.079}Mn_{1.821}Al_{0.1}O_4$ + 0.0118B | 5 |
| Example 3 | $Li_{1.138}Mn_{1.862}O_4$ | 1 |
| Example 4 | $Li_{1.059}Mn_{1.891}Mg_{0.05}O_4$ | 5 |
| Example 5 | $Li_{1.039}Mn_{1.811}Al_{0.1}Mg_{0.05}O_4$ | 5 |
| Comp. Example 1 | $Li_{1.065}Mn_{1.835}Al_{0.1}O_4$ | 1-30 |
| Comp. Example 2 | $Li_{1.072}Mn_{1.828}Al_{0.1}O_4$ | 5 |
| Comp. Example 3 | $Li_{1.072}Mn_{1.828}Al_{0.1}O_4$ + 0.0137B | 5 |
| Comp. Example 4 | $Li_{1.039}Mn_{1.811}Al_{0.1}Mg_{0.05}O_4$ | 5 |
| Comp. Example 5 | $Li_{1.072}Mn_{1.828}Al_{0.1}O_4$ | 4 |
| Comp. Example 6 | $Li_{1.072}Mn_{1.828}Al_{0.1}O_4$ | 5 |

Properties of lithium manganate particles

| Examples and Comp. Examples | Average secondary particle diameter $D_{50}$ (μm) | BET ($m^2/g$) | Lattice constant (nm) | Sulfer content (ppm) |
|---|---|---|---|---|
| Example 1 | 7.3 | 0.45 | 0.8198 | 12 |
| Example 2 | 9.0 | 0.41 | 0.8199 | 22 |
| Example 3 | 8.0 | 0.51 | 0.8193 | 15 |
| Example 4 | 9.2 | 0.51 | 0.8216 | 12 |
| Example 5 | 8.0 | 0.56 | 0.8199 | 21 |
| Comp. Example 1 | 15.5 | 0.67 | 0.8203 | 1620 |
| Comp. Example 2 | 7.7 | 0.64 | 0.8199 | 243 |
| Comp. Example 3 | 6.4 | 0.82 | 0.8202 | 521 |
| Comp. Example 4 | 6.5 | 0.75 | 0.8200 | 581 |
| Comp. Example 5 | 6.7 | 0.65 | 0.8205 | 21 |
| Comp. Example 6 | 7.5 | 0.62 | 0.8201 | 18 |

Battery characteristics

| Examples and Comp. Examples | Capacity 0.1 C (mAh/g) | Rate characteristic (%) | High-temperature cycle retention rate (%) | Capacity recovery rate (%) |
|---|---|---|---|---|
| Example 1 | 105 | 96 | 95 | 96 |
| Example 2 | 106 | 95 | 98 | 99 |
| Example 3 | 91 | 93 | 93 | 96 |
| Example 4 | 109 | 83 | 95 | 96 |
| Example 5 | 106 | 95 | 98 | 98 |
| Comp. Example 1 | 107 | 68 | 88 | 75 |
| Comp. Example 2 | 105 | 92 | 87 | 93 |
| Comp. Example 3 | 109 | 81 | 89 | 92 |
| Comp. Example 4 | 104 | 88 | 86 | 93 |
| Comp. Example 5 | 92 | 54 | 69 | 78 |
| Comp. Example 6 | 102 | 82 | 79 | 89 |

It is considered that owing to a residual sulfur component in the lithium manganate particles, the secondary battery obtained using the particles causes short circuit or becomes unstable when preserved under a high-temperature condition. The reason therefor is considered to be that when mixing the manganese oxide and the lithium compound with each other and calcining the resulting mixture, sulfur is reacted with lithium so that the sulfur remains and is present in the resulting particles in the form of an Li—S compound. For this reason, it is considered that an Li component which is to be inherently incorporated into the spinel structure becomes deficient, so that the resulting particles tend to suffer from deterioration in high-temperature characteristics such as elution of Mn therefrom under a high-temperature condition.

In accordance with the present invention, it is possible to reduce a sulfur content in the lithium manganate particles and therefore obtain a secondary battery having an excellent high-temperature storage property.

INDUSTRIAL APPLICABILITY

The lithium manganate particles according to the present invention have a reduced sulfur content and, therefore, can be suitably used as a positive electrode active material for a secondary battery having high output characteristics and excellent high-temperature storage characteristics.

The invention claimed is:

1. A process for producing lithium manganate particles having a composition represented by the following chemical formula 1:

$$Li_{1+x}Mn_{2-x-y}Y_yO_4+zA \qquad \text{(Chemical Formula 1)}$$

in which Y is at least one element selected from the group consisting of Al and Mg; A is a sintering aid element having a melting point of not higher than 850° C.; x and y satisfy 0.03≤x≤0.15 and 0≤y≤0.20, respectively; z is in the range of 0 to 2.5 mol % based on Mn, which lithium manganate particles have a sulfur content of 1 to 100 ppm and an average secondary particle diameter ($D_{50}$) of 1 to 15 μm, and have such properties that when measuring characteristics of a secondary battery produced by using the lithium manganate particles as a positive electrode active material, a high temperature cycle retention rate of the secondary battery is not less than 92%, and a capacity recovery rate of the secondary battery is not less than 95%, the process comprising the steps of:

mixing manganese oxide formed of $Mn_3O_4$, a Y element compound and a lithium compound with each other; and calcining the resulting mixture at a temperature of 910° C. to 1050° C.

2. The process for producing the lithium manganate particles according to claim 1, wherein the manganese oxide has a sulfur content of 1 to 60 ppm.

3. The process for producing the lithium manganate particles according to claim 1, wherein the manganese oxide has an average primary particle diameter of not less than 0.5 μm.

* * * * *